(12) United States Patent
Kim et al.

(10) Patent No.: US 7,705,996 B2
(45) Date of Patent: Apr. 27, 2010

(54) METHODS AND SYSTEMS FOR ULTRA-PRECISE MEASUREMENT AND CONTROL OF OBJECT MOTION IN SIX DEGREES OF FREEDOM BY PROJECTION AND MEASUREMENT OF INTERFERENCE FRINGES

(75) Inventors: Jung H. Kim, Columbus, OH (US); Chia-Hsiang Menq, Powell, OH (US)

(73) Assignee: Ohio State University, Columbus, OH (US)

( * ) Notice: Subject to any disclaimer, the term of this patent is extended or adjusted under 35 U.S.C. 154(b) by 40 days.

(21) Appl. No.: 11/488,931

(22) Filed: Jul. 18, 2006

(65) Prior Publication Data

US 2007/0013916 A1    Jan. 18, 2007

Related U.S. Application Data

(60) Provisional application No. 60/700,256, filed on Jul. 18, 2005.

(51) Int. Cl.
*G01B 9/02* (2006.01)
(52) U.S. Cl. .................................. 356/508
(58) Field of Classification Search ............. 356/497, 356/500, 508, 510
See application file for complete search history.

(56) References Cited

U.S. PATENT DOCUMENTS

| | | | | |
|---|---|---|---|---|
| 6,507,405 | B1 * | 1/2003 | Grek et al. | 356/479 |
| 6,597,460 | B2 * | 7/2003 | Groot et al. | 356/512 |
| 6,707,559 | B2 * | 3/2004 | Ge | 356/508 |
| 7,330,275 | B2 * | 2/2008 | Raksi | 356/508 |
| 7,433,052 | B2 * | 10/2008 | Tobiason et al. | 356/510 |

OTHER PUBLICATIONS

Y. Zhou, B.J. Nelson, B. Vikramaditya. "Integrating Optical Force Sensing with Visual Servoing for Microassembly", Journal of Intelligent and Robotic Systems, vol. 28, pp. 259-276, 2000.

R.S. Fearing, "Survey of Sticking Effects for Micor Parts Handling", Proc. 1995 IEEE/RSJ Int. Conf. on Intelligent Robots and Systems, Pittsburgh, Aug. 5-9. 1995, vol. 2, pp. 212-217.

S. Saito, H. Miyazaki, T. Sato, "Pick and Place Operation of a Micro Object with High Reliability and Precision based on Micro Physics under SEM", Proc. 1999 IEEE Int. Conference on Robotics & Automation, 2736-2743, Detroit, Michigan, May 1999, pp. 2736-2743.

(Continued)

*Primary Examiner*—Hwa S. A Lee
(74) *Attorney, Agent, or Firm*—Joseph J. Crimaldi; Roetzel & Andress

(57) ABSTRACT

A system and method for active visual measurement and servo control using laterally sampled white light interferometry (L-SWLI) for real-time visual tracking of six-degree-of-freedom (6 DOF) rigid body motion with near-nanometer precision. The visual tracking system is integrated with a 6 DOF motion stage to realize an ultra precision six-axis visual servo control system. Use of L-SWLI obtains the complete pose of the target object from a single image frame to enable real-time tracking. Six-degree-of-freedom motions are obtained by measuring the fringe pattern on multiple surfaces of the object or from a single surface with additional information gained from conventional image processing techniques.

23 Claims, 7 Drawing Sheets

OTHER PUBLICATIONS

B. Parvin, D.E. Callahan, W. Johnston, M. Maestre, "Visual Servoing for Micro Manipulation", Proceedings of the 13th Internt'l Conference on Pattern Recognition, Aug. 1996, vol. 3, pp. 25-29.

Y. Mezouar, P.K. Allen, "Visual servoed micropositloning for protein manipulation tasks," Intelligent Robots and System, 2002. IEEE/RSJ International Conference on, Sep. 30-Oct. 5, 2002, vol. 2. pp. 1766-1771.

T. Tanikawa, T. Arai, Y. Hasimoto, "Development of Vision System for Two-fingered Micro Manipulation", Proceedings of the Intelligent Robotics & Systems, Sep. 1997, pp. 1051-1056.

B. Vikramaditya, "Visually Guided Microassembly Using Optical Microscopes and Active Vision Techniques," Proc. 1997 IEEE Int. Conf. on robotics and Automation, New Mexico, Apr. 1997, pp. 3172-3177.

S. Fatikow, U. Rembold, "An automated microrobot-based desktop station for micro assembly and handing of micro-objects," 1996 IEEE Conference on Emerging Technologies and Factory Automation, Nov. 1996, vold. 2 pp. 586-592.

F. Arai, A. Kawaji, P. Luangjarmekom, T. Fukuda, K. Ltoigawa, "Three-dimensional bio-micromaniupulation under the microscope", Proceedings of IEEE International Conference on Robotics and Automation, 2001, vol. 1, pp. 604-609.

H. Yamamoto, T. Sano, "Study of micromanipulation using sterioscopic microscope", vol. 51, pp. 182-187, Apr. 2002.

S.J. Lee, K. Kim, D. Kim, J. Park, G.T. Park, "Recognizing and tracking of 3D-shaped micro parts using multiple visions fo micromanipulation,"Proceedings of International Symposium on Micromechatronics and Human Science, Sep. 9-12, 2001, pp. 203-210.

S.K. Nayar, Y. Nakagawa, "Shape from Focus," IEEE Transactions on Pattern Analysis and Machine Intelligence, vol. 16, No. 8, Aug. 1994.

M. Takeda, K. Mutoch, "Fourier transform profilometry for the automatic measuremnt of 3-D object shapes," Appl. Opt., vol. 24, pp. 3977-3982, 1983.

K. Creath, "Phase-shifting interferometry techniques", in Progress in Optics, E. Wolf, Elsevier, New York, 1988, vol. 26, pp. 357-373.

P.J. Caber,"Interferometric Profiler for Rough Surfaces", Appl. Opt., vol. 32, pp. 3438-3441, 1993.

T. Dresel, G. Haeusler, H. Venzke, "Three-dimensional sensing of rough surfaces by coherence radar", Appl. Opt., vol. 31, pp. 919-925, 1992.

M. Fleischer, R. Windecker, H.J. Tiziani, "Theoretical Limits of Scanning White-Light Interferometry Signal Evaluation Algorithm" Applied Optics, vol. 40, No. 17, Jun. 10, 2001.

B.K.P. Horn, Closed-form Solution of Absolute Orientation Using Unit Quaternions, J. Opt. Soc. Amer., vol. A-4, pp. 629-642, 1987.

K.S. Arun, T.S. Huang, and S.D. Blostein, "Least-squares fitting of two 3-D Point Sets", IEEE Trans. Pattern Anal. Machine Intell., vol. 9, pp. 698-700, 1987.

B.K.P. Horn, H.M. Hilden, and S. Negahdaripour "Closed-form Solution of Absolute Orientation Using Orthonormal Matrices", J. Opt. Soc. Amer., vol. A-5, pp. 1128-1135, 1988.

S. Umeyama, "Lease-squares Estimation of Transformation Parameters Between two Point Patterns", IEEE Trans. Pattern Anal. Machine Intell., vol. 13, pp. 376-380, 1991.

K. Kanatani, "Analysis of 3D Rotation Fitting", IEEE Trans. Pattern Anal. Machine Intell., vol. 16, pp. 543-549, 1994.

B.K.P. Horn, "robot Vision", MIT Press. Cambridge, MA, 1986.

Z. Yan, C.H. Menq, "Evaluation of Geometric Tolerances Using Discrete Measurement Data", Journal of Design and Manufacturing, vol. 4, pp. 215-228, 1994.

S.K. Kuo, "Development of an Improved Magnetic Suspension Stage and its Applications to Nano Imprinting and Nano Metrology", Ph.D. Dissertation, Department of Mechanical Engineering, Ohio State University, 2003.

S.K. Kuo and C.H. Menq, "Modeling and Control of a Six-Axis Precision Motion Control Stage", to appear in IEEE/ASME Transactions on Mechatronics, est. Nov. 2009.

C.Q. Davis, D.M. Freeman, "Using a Light Microscope to Measure Motions wiht Nanometer Accuracy" Optical Engineering, vol. 37, pp. 1299-1304, 1998.

* cited by examiner

METHODS AND SYSTEMS FOR ULTRA-PRECISE MEASUREMENT AND CONTROL OF OBJECT MOTION IN SIX DEGREES OF FREEDOM BY PROJECTION AND MEASUREMENT OF INTERFERENCE FRINGES

RELATED APPLICATIONS

This application is a Provisional Conversion of U.S. application Ser. No. 60/700,256 filed Jul. 18, 2005.

FIELD OF THE INVENTION

The present invention pertains generally to active visual measurement techniques capable of real-time visual tracking of six-degree-of-freedom (6 DOF) rigid body motion with near-nanometer precision (±10 nm).

BACKGROUND OF THE INVENTION

The specific approach of using microelectronic fabrication techniques to produce microelectromechanical systems (MEMS) has led to mostly planar parts having dimensions in the vertical direction of only a few micrometers, many other techniques are being developed and applied to make multi-scale 3D devices. Although these methods have yielded primarily experimental devices up until now, many researchers and practitioners believe that multi-scale 3D devices, whose components range in size from several millimeters to micrometers and down to nanometers, will have a much greater application range than MEMS in many industries including medicine, communications, defense, aerospace, consumer products, and many more. Experts in the field agree that existing devices have limitation barriers that may impede further innovation. The barriers can be broadly categorized into three areas: 1) design and fabrication, 2) metrology and testing, and 3) assembly and packaging.

Ultra precision motion control devices, e.g. piezo actuators, are extensively used in positioning and alignment schemes requiring the highest precision. These devices have internal control loops equipped with sensors that render ultra high resolutions. To achieve multi-degree-of-freedom actuation, very often multiple translational and/or rotational actuators are simply cascaded, and based on a pre-calibrated kinematic coordinate transformation between each actuator sensor coordinate frame (SCF) and the object coordinate frame (OCF), the desired position and orientation with respect to the OCF are commanded to each actuator. When dealing with dimensions of sub-micrometer range, small pre-calibration errors, such as those resulting from non-orthogonal transducer axes, can lead to erroneous results. Especially in the case that rotational motion is necessary, the effects of pre-calibration errors in terms of geometries and dimensions become very significant. Error sources such as thermal expansion and sensor drift can be even more critical and will attribute to system time variance with respect to the OCE which necessitates a different means of compensation.

In this respect, visual feedback can provide a direct measure of position and orientation with respect to an OCF and defines a common reference frame to which multiple objects are registered, revealing the relative position and orientation between objects that are subject to relative positioning and alignment. A robust solution is to acquire real-time visual feedback from the object space which continuously compensates for various time varying error sources. Furthermore, in addition to pre-calibration and time variant error sources, a major obstacle in the case of micro-manipulation is the uncertain mechanics of the micro-domain. They are surface forces which are a combination of Van der Waals forces, electrostatic surface charges and other forces that occur at the micro-level and that overwhelm the effect of gravity. Models of interaction forces and actuation schemes based on them have been proposed, however it is still maintained that visual feedback from the working domain combined with intelligent control schemes are the most robust solution.

Using visual feedback from optical microscopes to control micro-manipulation processes has been investigated by several researchers for applications in both the engineering and the bio-medical field. For most work done in this area, true real-time visual servoing only involves two degrees-of-freedom (DOF), i.e. x and y, within the focus plane of the microscope; a natural consequence due to the narrow depth of focus of an optical microscope. Proposed methods of recovering the third DOF, i.e. z, inside the framework of visual servoing under a microscope are as follows. Using stereoscopic techniques to recover depth was proposed. Depth recovery using active vision techniques such as Depth from Focus, and methods using active illumination with triangulation were also proposed. However each of these methods requires some sort of mechanical scanning or requires intensive computation which inherently limits its ability to deliver real time information in the z-direction. Moreover, the achievable depth resolution of all these methods is coupled with the lateral resolution of the image obtained by the optical microscope, which is limited by diffraction. This ultimately limits the achievable vertical resolution and causes a trade-off between field of view and the vertical resolution of the system.

Interferometric methods such as Phase Shifting Interferometry (PSI) and Vertically Sampled White Light Interferometry (V-SWLI) can achieve vertical resolutions in the nanometer range without the dependence on lateral resolution of the optics.

Vertically Sampled White Light Interferometry (V-SWLI) is emerging as a powerful tool for high precision, high speed, non-contact depth recovery of various technical and biological specimens. While PSI achieves higher resolution, V-SWLI maintains the advantages of interferometry, while overcoming important limitations, such as height ambiguity, limited measurement range, and the requirement of surface roughness, inherent in conventional PSI. V-SWLI is briefly discussed as it serves as a foundation for L-SWLI in many respects.

In SWLI, a broad band light source is used with an interferometer microscope. FIG. 1-(A) shows a schema of a Mirau-type interferometer microscope setup. The white light source is amplitude divided at the beam splitter 2 (FIG. 1-A), one path reflects off the reference plane and the other off the sample object, the two paths are recombined hence interfering with each other and the interference for each sample object point is detected at the CCD array. For V-SWLI measurement, either the object or the reference plane is scanned incrementally along the direction of the optical z-axis. Interference fringes occur only when the optical path difference (OPD) of the two arms of the interferometer are smaller than the coherence length. A pixel-intensity time history, called an interferogram, is sampled for each pixel of the CCD array plane while the OPD is changed incrementally. An interferogram during a 20 μm scan is shown in FIG. 1-(B). The interference is extremely localized, generating a sharply defined coherence region that is only a few micrometers wide. The rest of the distribution represents low-frequency background illumination that stems from test surface scatter and defocus.

The interferogram is constituted of a periodic signal modulated by an envelope function and can be simply modeled as, $$s(z)=B(z)\pm m(z-z_0)\cos(2\pi f_z \cdot z+\theta) \quad (1)$$

where $m(z-z_0)$ is the envelope function, $B(z)$ is the background illumination, $f_z$ is the carrier frequency and $\theta$ is phase. In order to obtain the height distribution, each interferogram of each pixel is processed to find the peak of $m(z-z_0)$, where the OPD of the two arms of the interferometer equal each other.

P. J. Caber proposed a method of demodulating the sampled interferogram to acquire the peak of the envelope function, which is explained briefly. The first step is to high-pass-filter the signal to get rid of low-frequency background illumination to get, $$s'(z)=m(z-z_0)\cos(2\pi f_z \cdot z+\theta) \quad (2)$$

The signal is then rectified, i.e. squared, in the second step, in effect doubling the carrier frequency, $$s''(z) = \frac{1}{2}m^2(z-z_0) + \frac{1}{2}m^2(z-z_0)\cos(4\pi f_z \cdot z + 2\theta) \quad (3)$$

In this step, the second term of (3) is shifted away from the first one in the frequency domain such that the two can be easily separated by a suitable low-pass-filtering operation, which effectively isolates $m^2(z-z_0)/2$ for processing. Finally the peak of this function is located, and the vertical position that corresponds to the peak is recorded. To achieve depth resolution that is beyond the sampling interval, simple curve fitting operations can be performed, which result in a more accurate estimation of the peak position. Depth resolution of the current system is below 10 nm due to several factors, including optical dispersion, sampling accuracy, and the flatness of the reference mirror of the interferometer. A more thorough investigation into the resolution limiting factors is done in M. Fleischer's "Theoretical Limits of scanning white-light interferometry signal evaluation algorithm" *Applied Optics*, vol. 40 17, 10 Jun. 2001.

SUMMARY OF THE PRESENT INVENTION

The present invention is novel method of real-time visual tracking of 6 DOF rigid body motion with near-nanometer precision (±10 nm). The present invention is capable of measuring the following six degrees of freedom: translation along the x, y, and z axes, and rotation about the x, y, and z axes. It is capable of conducting active visual measurement by placing interference fringes on an object, e.g. by reflecting a laser off of the object's surface, and measuring those fringes.

L-SWLI is based on the notion that, under appropriate assumptions, a single image of interference fringes imposed on an object surface (FIG. 3-(A)) contains enough information to determine the position of the object. The optical configuration for L-SWLI is identical to that of V-SWLI (FIG. 1), except the need for mechanical scanning is absent.

BRIEF DESCRIPTION OF THE FIGURES

In the Figures:

FIG. 8(B) is a graph of motion tracking for L-SWLI with the outer control loop turned on.

DETAILED DESCRIPTION

Figure 1:
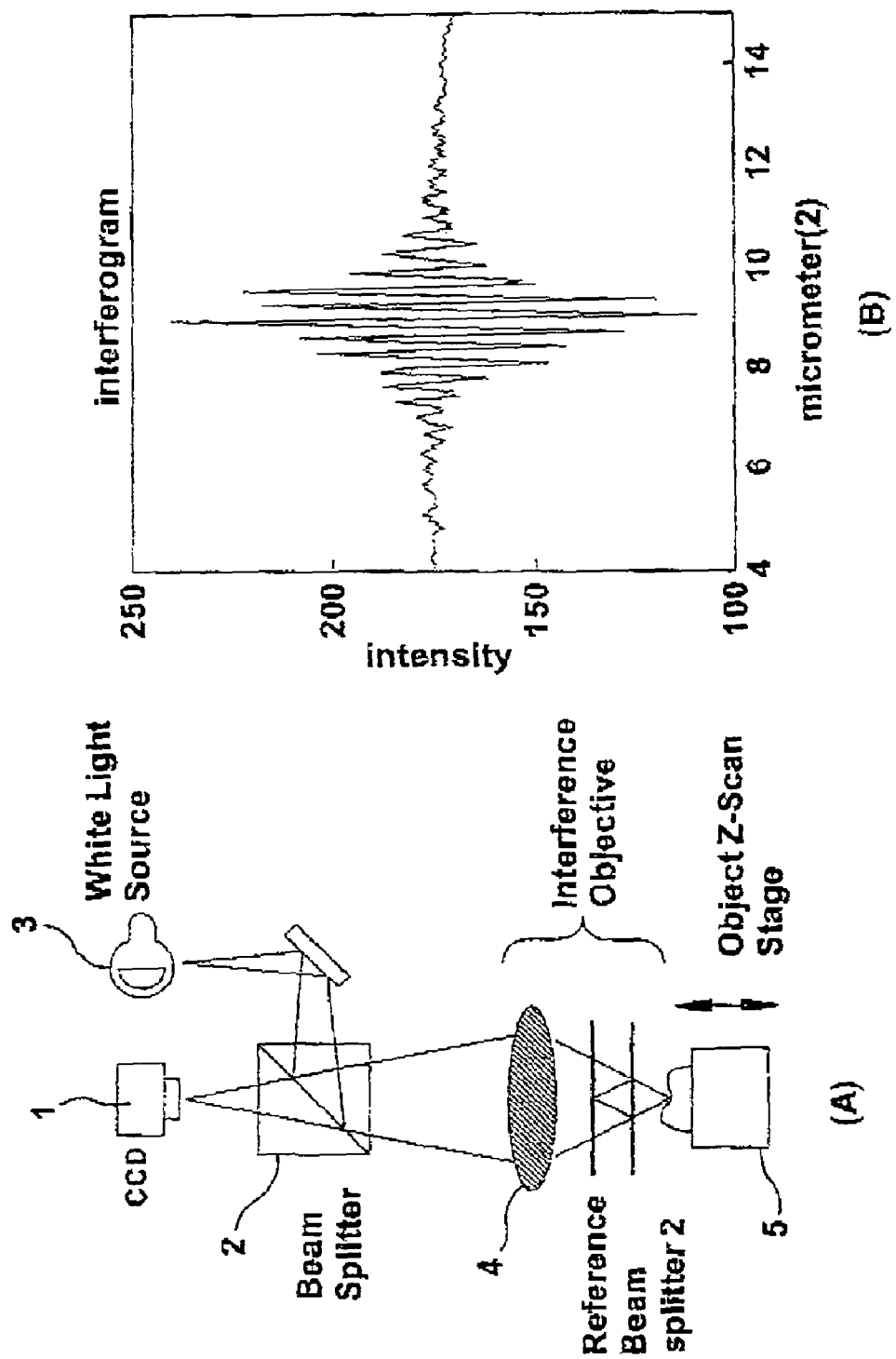
FIG. 1(A) is a schematic diagram of an SWLI setup (Mirau type)
FIG. 1(B) is an interferogram produced by V-SWLI.

FIG. 1(A) is a schematic diagram of an SWLI setup which includes a charge-coupled device (CCD) 1, optically coupled with a beam splitter 2 and a light source 3, an interference objective which includes at least one lens 4 and an object stage 5, such as an object Z-scan or magnetic suspension stage.

The following discussions assume that the object surface being measured is a sufficiently smooth plane surface and that the object is rigid body.

A. Lateral Fringe Pattern Analysis

Figure 2:
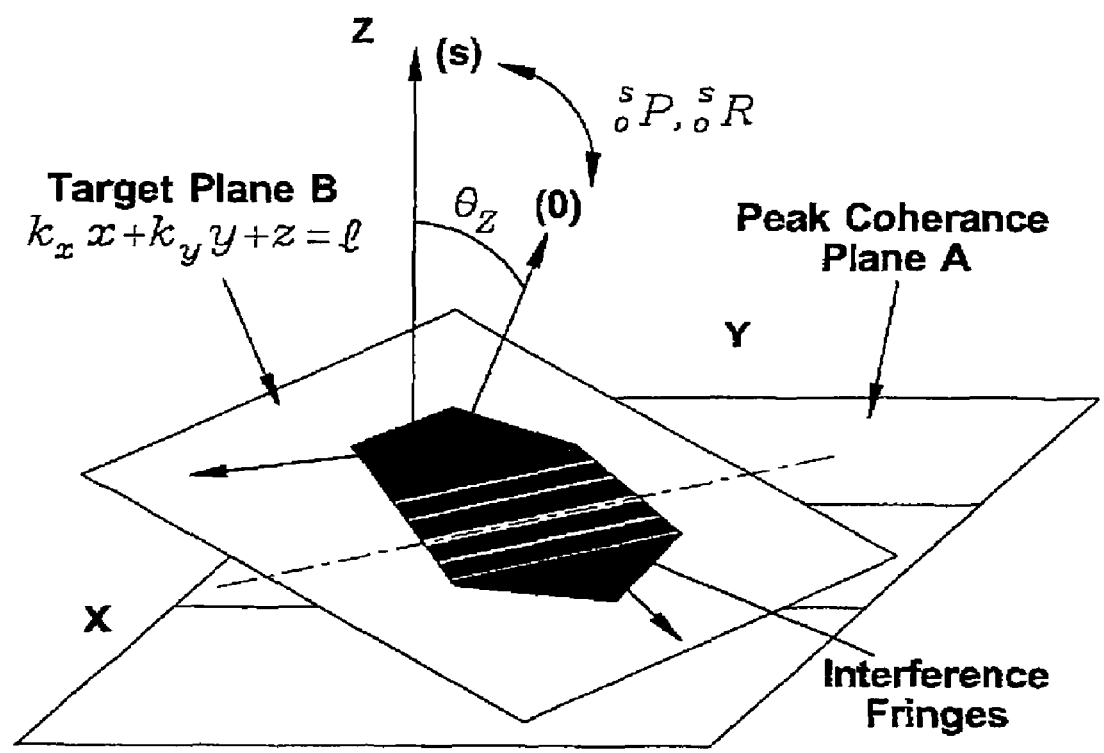
FIG. 2 is a spatial model of interference fringes imposed on an object.

FIG. 2 shows a spatial model of interference fringes imposed on an object surface under a WLI microscope. The surface of a target object, e.g. shown in FIG. 3-(A), defines the target plane B in FIG. 2. This plane traverses an imaginary plane that is parallel and at equal optical path difference with the reference plane (FIG. 1-(A)) of an interferometer. This imaginary plane is referred to as the peak coherence plane (PCP). Sensor coordinate frame {S} lies on the PCP and acts as the reference coordinate frame from which object position and orientation is measured. The plane containing the object surface is referred to as the target plane, $$k_x x + k_y y + z = l \quad (4)$$

Figure 3A:
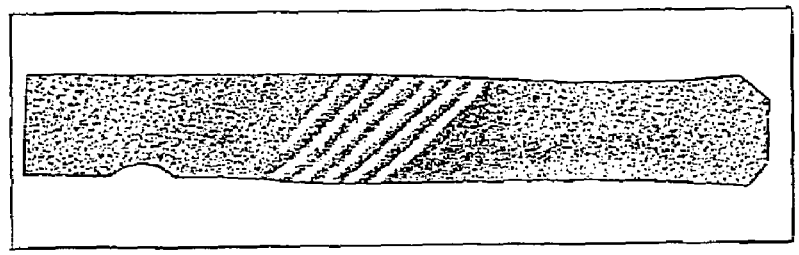
FIG. 3(A) is an example of a target plane, showing a fringe pattern and indicating a scan direction.
Figure 3B:
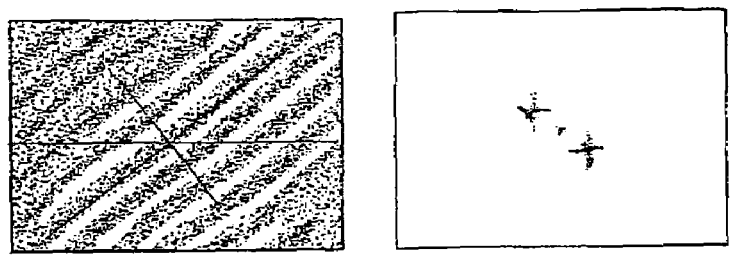
FIG. 3(B) (left) is a demonstration of 2D fringe distribution on a plan object surface.
Figure 3C:
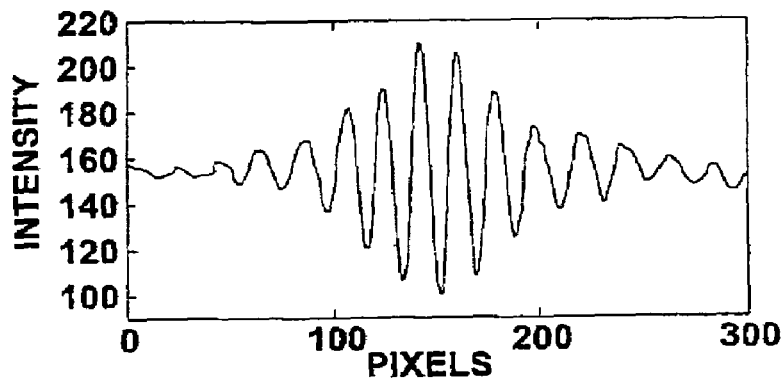
FIG. 3(C) is the result of applying a two-dimensional Fourier Transform to the fringe pattern and estimating the dominating frequencies in the x and y directions.

The spatial intensity distribution due to white light interference is a function of z along the optical axis, $$I(z)=e(z)\cos(2\pi f_z \cdot z+\varnothing) \quad (5)$$

where $e(z)$ is the envelope function, $f_z$ is the spatial frequency along z and is determined experimentally from V-SWLI (FIG. I) and $\varnothing$ is a constant phase term. This equation is in essence the same as equation (I), i.e. the interferogram model equation. Substituting equation (4) into (5), $$I(z)=e(l-k_x x-k_y y)\cos(2\pi k_x f_z x+2\pi k_y f_z y+\varnothing') \quad (6)$$

we obtain the equation of the 2D interference fringe distribution on a plane object surface (FIG. 3-(B) left). In this model, $k_x f_z$ and $k_y f_z$ are the spatial frequencies of the fringe pattern along the lateral x and y directions, respectively, and $e(l-k_x x-k_y y)$ is the 2D envelope function where $l-k_x x-k_y y=0$ is the equation of the intersection line L (FIG. 2) of the peak coherence plane A and target plane B. Obtaining $[k_x k_y 1]$ effectively determines the 3-DOF pose of the plane.

(a) Obtaining $k_x$ and $k_y$.

From (6), knowing the spatial frequency of the fringe pattern determines $k_x$ and $k_y$, which in essence is the tilt of the target plane. A robust method of obtaining these values is applying a two-dimensional Fourier Transform (FIG. 3-(B)) to the fringe pattern and estimating the dominating frequencies in both x and y directions. A 2D FFT of equation (6) is constituted of a low frequency element contributed by the envelope function and a prominent high frequency element representing the dominant carrier frequencies. The two bright spots symmetric to each other in FIG. 3-(B) represent the peak frequencies from which $k_x f_z$ and $k_y f_z$ and thus $k_x$ and $k_y$, are determined since $f_z$ is known. A simple curve fitting method around the detected peak will give a higher precision estimation.

(b) Obtaining l

Line L (FIG. 2) represents the intersection between the peak coherence (plane A) and target (plane B) planes and is simply $1-k_x x-k_y y=0$. Along this line is where the 2D envelope function (6) is maximized. Sampling the interference fringe image along any direction that crosses line L (FIG. 3-(A)) results in a signal with the similar form as (1), used in vertically sampled WLI. For example, sampling in the horizontal direction, as in FIG. 3-(A), is equivalent to substituting a constant value for y in (6), which results in the laterally sampled interferogram as shown in FIG. 3-(C). The method of detecting the position of peak coherence is also the same as in SWLI. Coordinates $[x_p\ y_p]$ designating the peak position are obtained and can be substituted into (4) to get, $$l = k_x x_p + k_y y_p \quad (7)$$

Thus the target plane equation is fully obtained.

(c) Surface Constraints and Measurement Range

Since the working principle is based on fringe analysis, in addition to the size of the target surface and the lateral resolution of the optical microscope, the measurement range of L-SWLI is closely related to the tilt of the target plane $\theta_z$ (FIG. 2), which is related to plane parameter $$k_x \text{ and } k_y \text{ by } \theta_z = \tan^{-1}\sqrt{k\frac{2}{x} + k\frac{2}{y}}.$$

The most fundamental characteristic length of the resulting fringe pattern is related to the coherence region along the z axis, as mentioned in the Background of the Invention section. For subsequent calculations, the characteristic length is denoted as $W_z$, the width of the modulating envelope sampled along the z axis, and can be experimentally determined (FIG. 1-(B)). When $\theta_z$ decreases, the fringe pattern projected on the target plane becomes sparser, and width of modulating envelope along the sampling direction increases to $W_z/(\sin \theta_z \cdot \cos \theta_N)$, where $\theta_N$ defines the sampling direction, measured from the gradient direction of the fringe pattern (FIG. 3-(B)). Since the object surface along the sampling line should be long enough to contain the laterally distributed interferogram, the width of the target surface along the sampling line, $W_{SL}$, should at least be that of the modulating envelope. This constraint results in a necessary condition, $$\theta_z > \sin^{-1}[W_z/(W_{SL} \cdot \cos \theta_N)] \quad (8)$$

As a matter of fact, as $\theta_z$ approaches zero, fringe pattern disappears. On the other hand, if the tilt of the plane is too large, the fringes will be too bunched up to be visible, therefore approaching the Nyquist's Sampling Limit. This constraint can be expressed as follows, $$\theta_z < \tan^{-1}\left[\frac{P_z}{2P_l}\right] \quad (9)$$

where $P_z$ is the period of the interferogram along the z-axis and $P_l$ is the lateral optical resolution. For our experiment, L-SWLI is possible if $1.71° < \theta_z < 15.3°$.

There also exists a constraint on surface roughness. The surface roughness of the cantilever used in our current setup (FIG. 3-(A)) is about 20 nm peak to peak. It is expected that the low pass filtering in the peak-detection algorithm would filter out high frequency surface variations and should make the algorithm relatively insensitive to relatively high frequency roughness while low frequency components should have some effect. A more detailed study into this, especially on low frequency surface variations, is left for future investigation.

B. Six DOF from Multiple Planes

The plane equation obtained in section I-A determines three parameters. Therefore, additional information is needed to completely determine the pose of the object. One method of achieving this is analyzing the fringe pattern from multiple planes when the object contains at least three planar surfaces.

$$k_{xi}x + k_{yi}y + z = l_i\ i = 1, 2, 3, \ldots, m \quad (10)$$

An alternative way of expressing the planes is in terms of their normal vectors $\hat{n}_i$ and distances from the origin $d_i$, $\hat{n}_i^T x = d_i$, where $\hat{n}_i$ and $d_i$ can be expressed in terms of the three parameters in (10), $$\hat{n} = [k_{xi} k_{yi} 1]^T / \sqrt{k_{xi}^2 + k_{yi}^2 + 1} \quad (11)$$

$$D_1 = l_1 \sqrt{k\frac{2}{xi} + k\frac{2}{yi} + 1} \quad (12)$$

As shown in FIG. 2, target coordinate frame {O} is attached to the moving target object and sensor coordinate frame {S} is the reference frame. Assuming the geometry of the object is known, either based on the design or from measurement, and the position and orientation of the associated planes are denoted as $^O\hat{n}_i$ and $^O d_i$, the position and orientation of the moving object can then be determined by establishing the translation vector, $_O{}^S P$, and rotation matrix, $_O{}^S R$, between the two coordinate frames based on measured $^S\hat{n}_i$ and $^S d_i$. This problem is similar to the one of fitting two 3-D point sets, several approaches of which were developed by employing least-squares minimization. It was shown in these approaches that the original least-squares problem could be reduced to two parts, and the rotation matrix and translation vector could be found separately in sequence. The present invention uses a similar approach. The only difference is that the translation vector can be found independently from the rotation matrix.

(a) Determination of Position

Each plane has a point, $^O d_i {}^O \hat{n}_i$, which is well defined in the target coordinate system. In the sensor coordinate system, its position vector is expressed as $_O{}^SP + {}^Od_i{}^S\hat{n}_i$. The projection of this position vector to the plane normal leads to a constraint equation for each plane.

$${}^S\hat{n}_i^T {}_O^S P = {}^Sd_i - {}^Od_i \quad i=1, 2, 3, \ldots, m \tag{13}$$

The translation vector $_O{}^SP$ can be easily obtained from least squares estimation.

(b) Determination of Orientation

The rotation matrix $_O{}^SR$ establishes the transformation of the surface normal of each plane in the two coordinate systems.

$${}^S\hat{n}_i = {}_O^S R {}^O\hat{n}_i \quad i=1, 2, 3, \ldots, m \tag{14}$$

In least squares estimation, the objective is to find $_O{}^SR$ to minimize $$J = \sum_{i=1}^{m} \| {}^S\hat{n}_i - {}_O^S R {}^O\hat{n}_i \|^2 \tag{15}$$

This mathematical problem has been extensively studied. Established computational approaches include techniques using the quaternion representation, singular value decomposition, and polar decomposition, and other refined forms.

C. Six DOF from a Single Plane

Fringe analysis of a single plane complemented by information acquired from conventional image processing methods can also determine the complete pose of the object. A popular way of specifying orientation is Euler angles, which describe any possible orientation in terms of a rotation about the z-axis, followed by a rotation about the new y-axis, and finally a rotation about the new z-axis.

$${}_O^S R = ROT(\hat{z}, \alpha) ROT(\hat{y}, \beta) ROT(\hat{z}, \theta) \tag{16}$$

Surface normal, $[k_x k_y]^T$, obtained from fringe analysis provides partial information for the rotation matrix.

$${}_O^S R = R(\alpha, \beta) ROT(\hat{z}, \theta) = R(k_x, k_y) ROT(\hat{z}, \theta) \tag{17}$$

Where $$R(\alpha, \beta) = \begin{bmatrix} c\alpha c\beta & -s\alpha & c\alpha s\beta \\ s\alpha c\beta & c\alpha & s\alpha s\beta \\ -s\beta & 0 & c\beta \end{bmatrix}$$

and $$\alpha = \tan^{-1}\left(\frac{k_y}{k_x}\right), \quad \beta = \tan^{-1}\sqrt{k_x^2 + k_y^2}$$

The symbols 'c' and 's' are cosine and sine, respectively. It is evident that θ is the angle of rotation about surface normal and cannot be determined from fringe analysis of a plane. Nevertheless, this in-plane rotation can be determined from the image of pre-determined line features, such as edge lines of the object (FIG. 3-(A)). The 2D coordinate of a line feature can be expressed in the target coordinate system as follows.

$$\begin{bmatrix} {}^Ox_1(\lambda) \\ {}^Oy_1(\lambda) \end{bmatrix} = \begin{bmatrix} c{}^O\phi_i & -s{}^O\phi_i \\ s{}^O\phi_i & c{}^O\phi_i \end{bmatrix} \begin{bmatrix} {}^Od_1 \\ \lambda \end{bmatrix} \tag{18}$$

in which ${}^O\phi$ defined the orientation, ${}^Od$, denotes the distance from the origin, and λ is a feature parameter of the line. The projection of the line on 2D sensor plane can then be derived.

$$\begin{bmatrix} {}^Sx \\ {}^Sy \end{bmatrix} = \begin{bmatrix} {}_O^S p_x \\ {}_O^S p_y \end{bmatrix} + \begin{bmatrix} c\alpha c\beta - s\alpha \\ s\alpha c\beta c\alpha \end{bmatrix} \begin{bmatrix} c(\theta + {}^O\phi_1) - s(\theta + {}^O\phi_1) \\ s(\theta + {}^O\phi_1) \; c(\theta + {}^O\phi_1) \end{bmatrix} \begin{bmatrix} {}^Od_1 \\ \lambda \end{bmatrix} \tag{19}$$

In real-time measurement, these line features are localized with sub-pixel accuracy from a normalized convolution based on optical flow of the 2D image of the object. The line features, e.g. in FIG. 3-(A), are found unambiguously when the angular displacement of the target object is assumed to be small, as in our case. The line fitting is performed to obtain ${}^S\phi$, and ${}^Sd_1$ from least squares estimation. Let the orientation of the fitted line equal to that derived in (19), the angle of rotation about surface normal can be determined.

$$\theta = \tan^{-1}\left[\frac{s({}^S\phi_1 - \alpha)}{c({}^S\phi_1 - \alpha)c\beta}\right] - {}^O\phi_1 \tag{20}$$

Substituting (19) to the equation of the fitted line, ${}^Sx \cos{}^S\phi_i + {}^Sy \sin{}^S\phi_i = {}^Sd_i$, one can obtain the following result.

$$c{}^S\phi_i \cdot {}_O^S p_x + s{}^S\phi_i \cdot {}_O^S p_y = {}^Sd_i - \sqrt{1 - s^2\beta \cdot c^2({}^S\phi_i - \alpha)} \cdot {}^Od_i \tag{21}$$

It can be seen that 2D image of a single line feature is sufficient for the determination of rotation angle B and that given 2D images of m (m≥2) line features, least squares estimation based on equation (21) can be employed to determine $_O{}^Sp_x$ and $_O{}^Sp_y$. With $_O{}^Sp_x$ and $_O{}^Sp_y$, $_O{}^Sp_z$ can be obtained from the plane equation characterized by $k_x$ and $k_y$, and 1.

II. Visually Guided Motion Control

The developed L-SWLI is capable of real-time visual tracking of 6-DOF rigid body motion. It can be employed for visually guided motion control. The visual tracking system is integrated with a six-axis motion control stage to realize an ultra precision six-axis visual servo control system.

A. Motion Control Stage

A six-axis magnetic suspension stage (MSS) was developed at Ohio State University. The MSS utilizes four DC linear motors for horizontal actuation (x, y, θ) and four electromagnets for vertical actuation (z, α, β), therefore eight power amplifiers, to suspend and servo the moving stage. The travel range of the moving stage is 4 mm×4 mm×2 mm in translation and 1°×1°×2° in rotation. An improved laser interferometer measurement system was developed and employed to measure six-axis motion of the moving stage. In the new design, the linear resolution for vertical motion is 1.24 nm and 0.625 nm for horizontal motion. The stage is controlled with feedback from the six-axis laser interferometer system. Feedback linearization and current distribution were implemented to linearize and uncouple the six axes of the actuated moving stage. In motion control, robust controllers were employed to compensate the joined effect of disturbance, modeling error, and cross coupling. Experimental results in terms of positioning stability (±2 nm horizontal and ±10 nm vertical), multi-axis contouring, large travel range, and disturbance rejection were illustrated. Uniform positioning stability and invariant dynamic response (50 Hz) within the designed travel volume were demonstrated.

B. Integrated Visual Servo System

Figure 4:
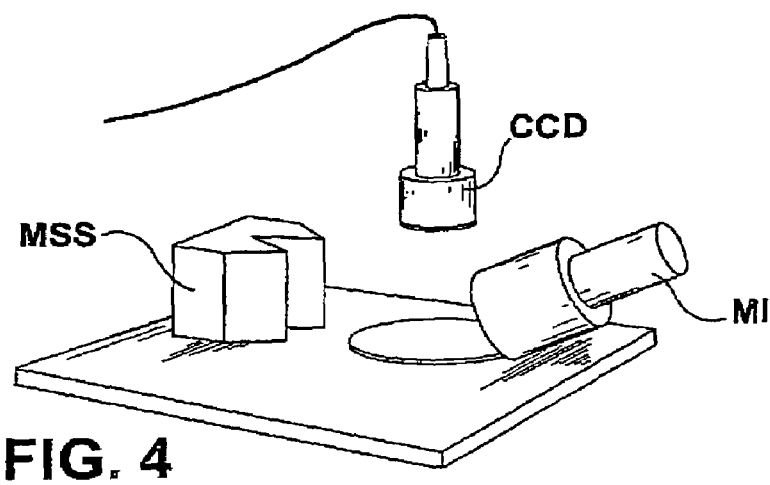
FIG. 4 is a photograph of an integrated visual servo system embodiment of the invention including a microscope interferometer MI, a charge-coupled device CCD and a magnetic suspension stage operatively connected as described for visual precision six-axis servo control.

A white light interference (WL1) microscope is integrated with the MSS. FIG. 4 shows the WLI microscope hovering over the MSS. The microscope and MSS are placed on an optical table (Newport) for external vibration isolation. The microscope used is a Leica DMLM reflectance microscope with 2 objective lenses, 5× and 20×. Each lens has an interferometer attachment. The 20× objective was used in the conducted experiments, the results of which would be discussed later. A 12 V 100 W unfiltered halogen light source was used to provide the broadband illumination. The CCD camera (Hitachi Kp-m 1) attached to the WLI microscope captures and transfers images to the master PC (Pentium III) for processing. The master PC is equipped with a Matrox Genesis image capture and processing board equipped with an on-board processing unit (Texas Instruments 'C8O) that is used to perform the 2D FFT for fringe pattern analysis and the normalized convolution used for pattern matching. The MSS is controlled by a separate PC (Pentium II) and communicates with the master PC through a parallel port.

Target objects are fixed to the stage and are imaged under the microscope for measurement. The large travel range and high resolution 6-axis maneuverability of the MSS integrated with 6-DOF measurement capabilities of the WLI microscope create an agile platform for ultra high precision positioning and alignment.

C. Visual Feedback Control

Figure 5:
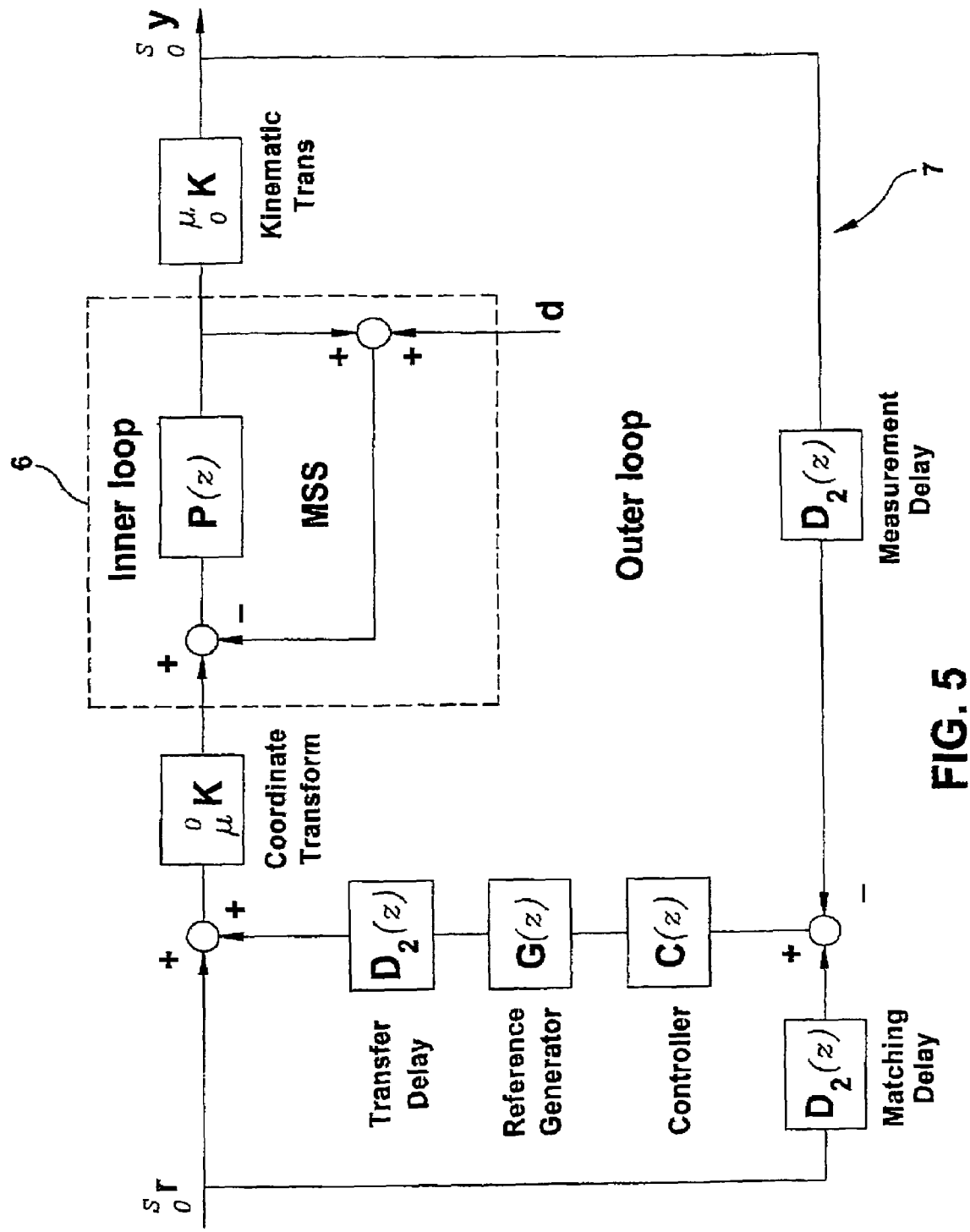
FIG. 5 is a block diagram of a six-axis visual servo control system.

The objective is to employ the real-time tracking capability of the developed L-SWLI to control the target object's motion with respect to the sensor coordinate frame {S} of the WLI microscope. A block diagram of the six-axis visual servo control system is shown in FIG. 5. It consists of an inner control loop, generally indicated at 6, which is the MSS control loop, and an outer control loop, generally indicated at 7, which employs visual feedback from L-SWLI measurement. The sampling frequency of the inner control loop is 1000 Hz whereas the outer control loop is 25 Hz, which is limited by the camera frame rate.

The relatively high bandwidth inner control loop stabilizes and governs the non-linear transient dynamics of the MSS, and achieves ultra high precision motion control in reference to the MSS coordinate frame {M}. However, as can be seen in FIG. 5, when controlling the target object's motion two uncertainties cannot be controlled by the inner loop. The first one is the laser reading disturbance, d, mainly due to the laser measurement drift. When the target object is fixed to the MSS through a mechanical linkage, the second uncertainty is related to the kinematic transformation from the MSS coordinate frame {M} to the target object, $_O^M K$. An inverse model, $_M^O \hat{K}$, is necessary for controlling the target object's motion. However, due to calibration error and thermal structure drift, $_M^O K$ constantly changes and $_M^O \hat{K}$ is not the perfect inverse.

$$_O^M K _M^O \hat{K} = I + \Delta_K \tag{22}$$

where I is an identity matrix and $\|\Delta_K\| \ll 1$. It was observed that without environmental control the measurement drift and thermal structure drift in a single axis could grow as much as 100 nm in 60 seconds.

Figure 6:
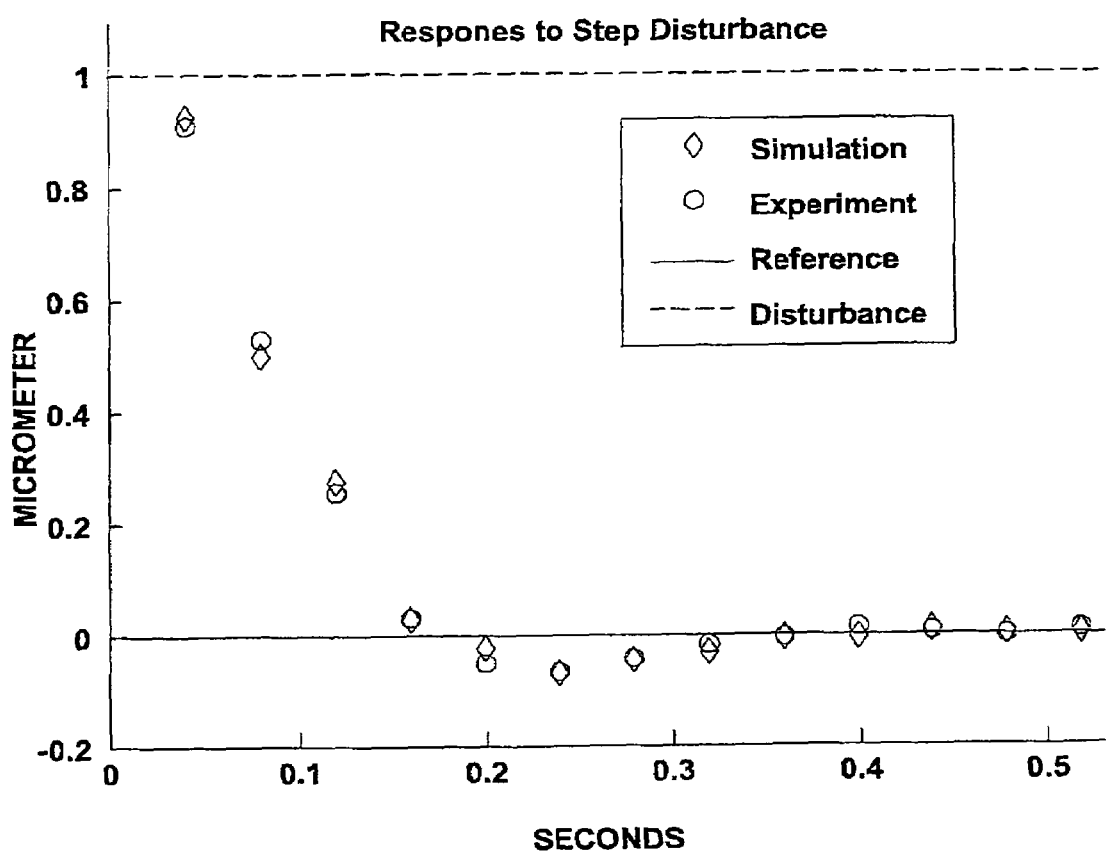
FIG. 6 is a plot of the actual response of the system when subjected to a step disturbance.

The control of the outer loop is with respect to the visual sensor coordinate frame {S}, and the objective is to control the relative motions between objects and tools. Using visual feedback to compensate the errors induced by the two time varying uncertainties, d and $\Delta_K$, is demonstrated. The integrated system model in FIG. 5 is a multi-input-multi-output (MIMO) system where the lower case symbols represent 6×1 vectors and the upper case symbols are 6×6 transfer function matrices. The inner loop has much higher bandwidth than the outer loop, and decoupled control can be achieved. Therefore, its transfer function matrix can be simplified to be I. The outer loop controller is denoted as C(z), followed by a reference generator G(z), replacing a usual zero-order-hold and generating smooth reference trajectories for the MSS to avoid possible vibrations. The measurement delay caused by CCD integration and computation time is modeled as $D_1(z)$ and $D_2(z)$ is the delay caused by data transfer from the L-SWLI PC to the MSS controller PC. It can be seen that the reference input vector $_O^S r$ is fed directly to the inner-loop and also is compared with the outer loop feedback for motion regulation. The output vector $_O^S y$ can be derived as follows.

$$_O^S y = _O^S r + [I + L(z)]^{-1} [\Delta_x _O^S r - _O^M K d] \tag{23}$$

where $$L(z) = (I + \Delta_K) D_1(z) C(z) G(z) D_2(z) \tag{24}$$

is the loop gain matrix. It is evident that the effects of kinematic errors and measurement drifts are attenuated by the high gain of the loop gain matrix L(z). Since decoupled control can be achieved for the MSS, it is natural to have a decoupled design for the outer control loop. In other words, all the transfer function matrices in the outer loop are diagonal matrices. Nevertheless, due to the uncertainty $\Delta_K$ in the loop gain matrix, the resulting six-axis system cannot be completely decoupled and the dynamics of each axis cannot be perfectly identical. In the current implementation, G(z) behaves like a digital integrator followed by a low pass filter and a lead compensator is chosen for C(z) to improve the stability and transient dynamics of the outer-loop, resulting in a control bandwidth of 3 Hz. One experiment was conducted to illustrate the performance of the visual feedback control. FIG. 6 shows the actual response of the system when subjected to a step disturbance. The result of computer simulation is also shown in the same figure for comparison. The disturbance was caused by intentionally applying a 1 µm step drift in one of the measurement axes of the MSS. It is seen that after applying the step drift the MSS quickly reacted to the laser reading, causing a 1 µm position error in the visual sensor coordinate, and the outer control loop brought it back to the reference position in about 0.3 seconds.

III. Experimental Results

Experiments demonstrating motion resolution and tracking performance of the developed visual servo control system are presented as follows.

A. Motion Resolution

The motion resolution of the developed visual servo control system based on Single Plane L-SWLI was tested. A micro cantilever (MikroMasch) was the target object. The width, length, and thickness of the cantilever are 35 µm, 130 µm, 2 µm, respectively. The cantilever is a perfect example of an object containing a smooth single plane surface and has a resonance frequency of 190 kHz, therefore can be considered a rigid body.

Figure 7:
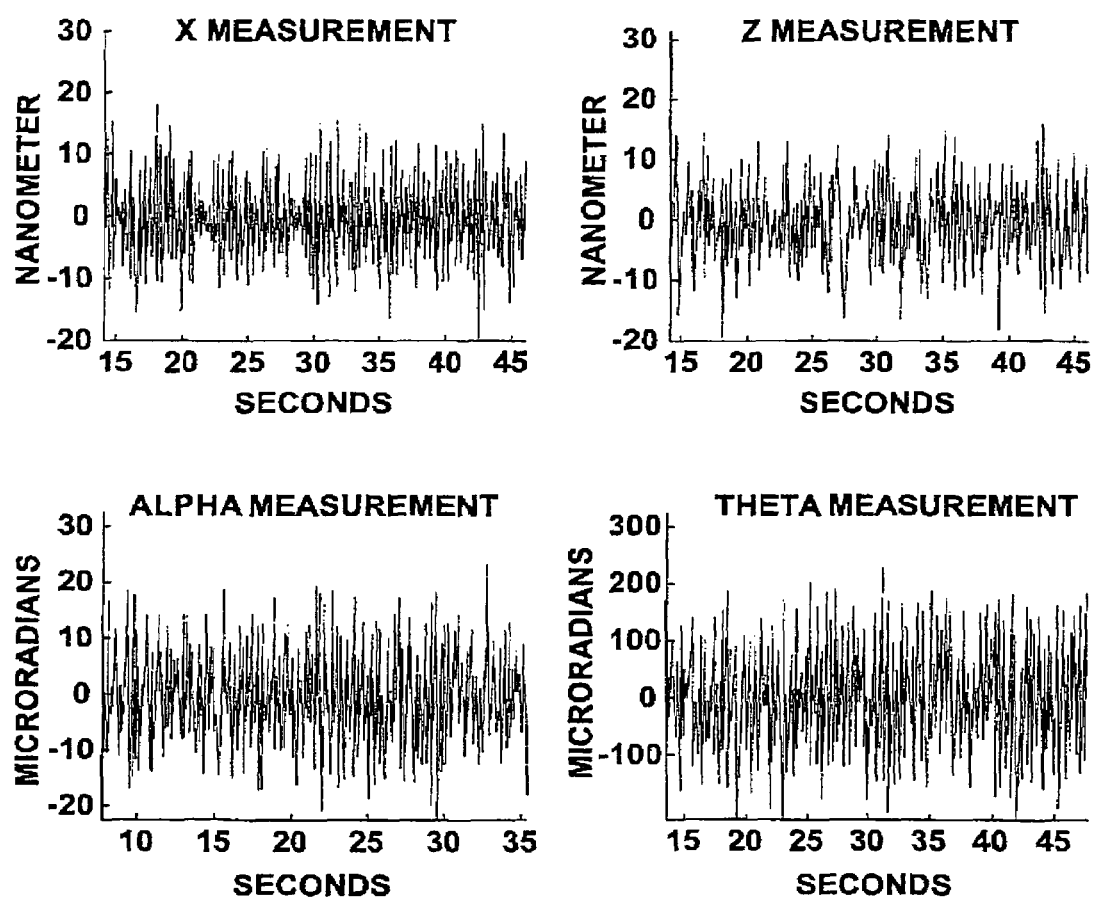
FIG. 7 is a graph of motion resolution for axes x, z, $\alpha$, and $\theta$.

FIG. 7 shows the L-SWLI measurements taken when the cantilever is placed on the MSS moving stage and the L-SWLI outer loop is activated to regulate the cantilever at a specified position with respect to the visual sensor reference coordinate frame. The x-axis has peak to peak stability of approximately ±10 nm with RMS of 8.8 nm. This resolution is limited by several different factors such as optical and imager resolution and image contrast among others. The z-axis has peak to peak ±10 nm stability with RMS of 9.2 nm. The main source of this noise is considered to be from mechanical vibration, relative structural vibration between the hovering microscope and the MSS. Better results are expected with improved structural design.

The α-axis has peak to peak stability of approximately ±15 μrad and θ-axis approximately ±150 μrad. The significant difference between the two axes owes to at least two reasons. Firstly, different methods were involved in the measurement, in which was directly obtained from the interference patterns and B was obtained from 2D image of line features. Secondly, lengths of the line features employed are probably too small. Consequently, the estimated rotation angle θ is sensitive to measurement noise. Obviously, the motion resolution in all axes is expected to increase with increased sampling rate of the outer control loop, which is bounded by the CCD frame rate. The current frame rate is 25 Hz, however cameras with superior performance are commercially available.

B. Performance of Tracking Control

Figure 8A:
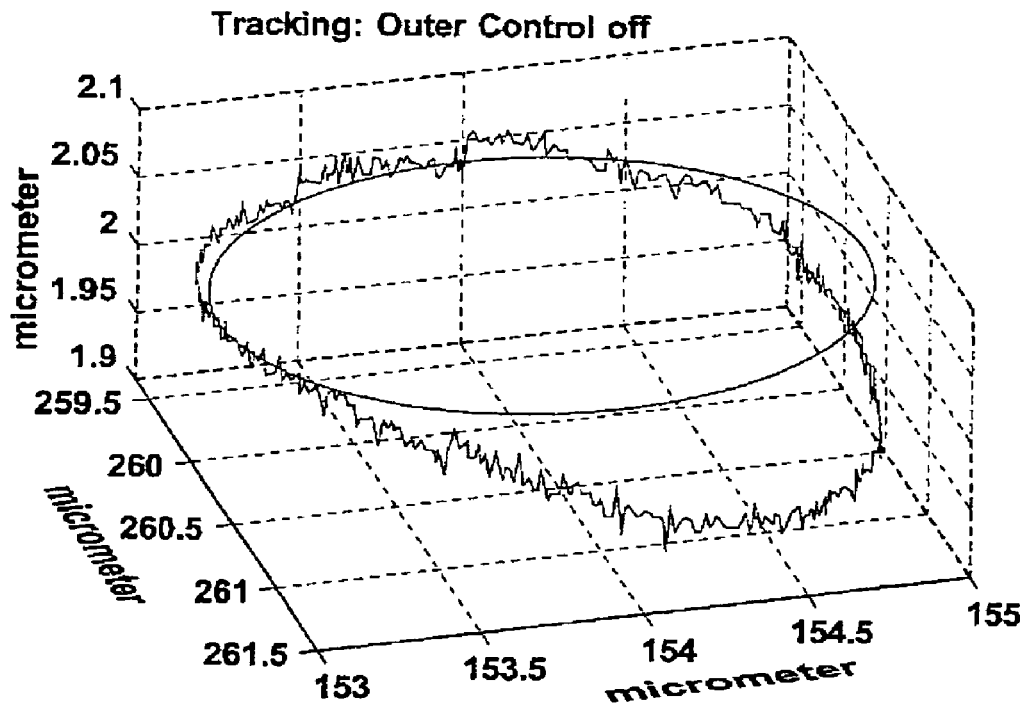
FIG. 8(A) is a graph of motion tracking performance for L-SWLI with the outer control loop turned off.
Figure 8B:
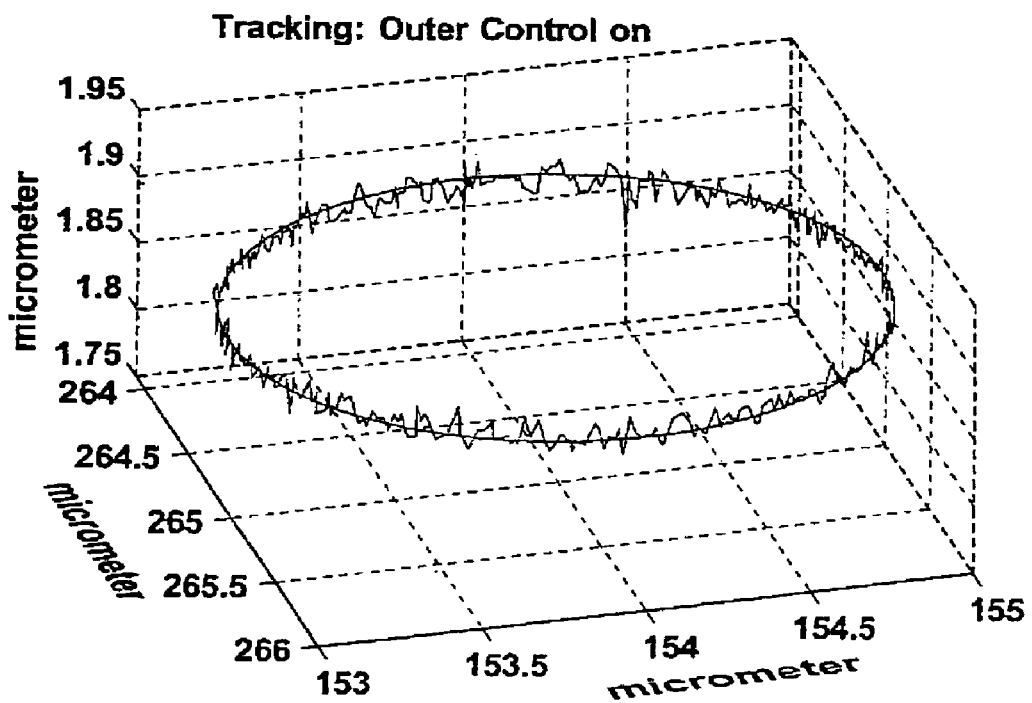

In order to demonstrate the motion tracking capability of the integrated system, three dimensional tracking of a 1 μm radius circle was performed. The results are shown in FIG. 8. A reference circle (smooth curve) in 3D space parallel to the horizontal x-y plane of the L-SWLI coordinate frame is established. The object tracks this circle in the clockwise direction, moving at a speed of 10 μm/sec. FIG. 8-(A) shows the object's motion in reference to the visual sensor coordinate system when the outer control loop is turned off. It can be seen that the disparity between the laser interferometer measurement and the L-SWLI measurement is significant. The disparity is mostly due to the measurement drift of the laser interferometer measurement system, the thermal structural drift of the MSS, and the kinematic error of the mechanical linkage between the MSS and the target object. FIG. 8-(B) shows the object's motion in reference to the visual sensor coordinate system when the outer control loop is turned on. It is evident that the effects of measurement drift and kinematic error are attenuated by the visual feedback control. The comparison also clearly exhibits that the L-SWLI based outer control loop serves as a motion regulator for the six-axis servo control system.

A novel measurement methodology was developed and integrated into a six-axis motion stage to realize an ultra precision 6-axis visual servo control system. Experimental results demonstrated real-time measurement of six degrees of freedom rigid body motion using L-SWLI and achieved near nanometer precision in three translational axes. Experiments performed on the integrated system demonstrated the effectiveness of the visual servo control as a real time motion regulator. Upon further integration with innovative design and implementation of tooling, the system can be applied to achieve automatic assembly and packaging of multi-scale 3D engineered devices. Moreover, the developed technology will also facilitate 3D imaging and manipulation of biological systems at multiple scales.

What is claimed is:

1. A system for determining the direct measurement of an object's pose with six degrees of freedom (DOF), the system comprising:
   at least one computer programmed to calculate six degrees of freedom of an object's motion relative to a fixed reference plane and/or an object's position relative to a fixed reference plane by fringe pattern analysis;
   a broad band illumination-based interferometer; and
   at least one image capture device capable of capturing and transferring images to the at least one computer,
   wherein the broad band illumination-based interferometer is optically coupled to the at least one image capture device,
   wherein the system determines the motion and/or position of the object relative to a fixed reference plane, and
   wherein the system determines an object's rose with six degrees of freedom (DOF) from an image captured by the at least one image capture device.

2. The system of claim 1, wherein the system operates in real time.

3. The system of claim 1, wherein the broad band illumination is white light.

4. The system of claim 1, wherein the at least one image capture device is at least one CCD camera.

5. The system of claim 1, wherein the system is designed to conduct real time measurement object's rigid body motion with six degrees of freedom (DOF).

6. The system of claim 1, wherein the system is utilized to provide positioning and alignment data.

7. The system of claim 1, wherein the system is utilized as a motion sensor in a visually-guided motion control system.

8. The system of claim 1, wherein the fringe pattern analysis is accomplished via programming the computer to apply a two dimensional Fourier Transform to a fringe pattern generated from the object to be measured.

9. A system for determining the direct measurement of an object's pose with six degrees of freedom (DOF), the system comprising:
   at least one computer programmed to calculate six degrees of freedom of an object's motion relative to a fixed reference plane and/or an object's position relative to a fixed reference plane by fringe pattern analysis;
   a laser illumination-based interferometer;
   a broad band illumination-based interferometer; and
   at least one image capture device capable of capturing and transferring images to the at least one computer,
   wherein the broad band illumination-based interferometer is optically coupled to the at least one image capture device,
   wherein the system determines the motion and/or position of the object relative to a fixed reference plane, and
   wherein the system determines an object's pose with six degrees of freedom (DOF) from an image captured by the at least one image capture device.

10. The system of claim 9, wherein the system operates in real time.

11. The system of claim 9, wherein the broad band illumination is white light.

12. The system of claim 9, wherein the at least one image capture device is at least one CCD camera.

13. The system of claim 9, wherein the system is designed to conduct real time measurement object's rigid body motion with six degrees of freedom (DOF).

14. The system of claim 9, wherein the system is utilized to provide positioning and alignment data.

15. The system of claim 9, wherein the system is utilized as a motion sensor in a visually-guided motion control system.

16. The system of claim 9, wherein the fringe pattern analysis is accomplished via programming the computer to apply a two dimensional Fourier Transform to a fringe pattern generated from the object to be measured.

17. A Fourier Transform-based system for determining the direct measurement of an object's pose with six degrees of freedom (DOF), the system comprising:
- at least one computer programmed to calculate six degrees of freedom of an object's motion relative to a fixed reference plane and/or an object's position relative to a fixed reference plane by fringe pattern analysis;
- a broad band illumination-based interferometer; and
- at least one image capture device capable of capturing and transferring images to the at least one computer,
- wherein the broad band illumination-based interferometer is optically coupled to the at least one image capture device and wherein the system determines the motion and/or position of the object relative to a fixed reference plane using a two-dimensional Fourier Transform analysis.

18. The system of claim 17, wherein the system operates in real time.

19. The system of claim 17, wherein the broad band illumination is white light.

20. The system of claim 17, wherein the at least one image capture device is at least one CCD camera.

21. The system of claim 17, wherein the system is designed to conduct real time measurement object's rigid body motion with six degrees of freedom (DOF).

22. The system of claim 17, wherein the system is utilized to provide positioning and alignment data.

23. The system of claim 17, wherein the system is utilized as a motion sensor in a visually-guided motion control system.

* * * * *